United States Patent
Kim et al.

(10) Patent No.: US 9,208,076 B2
(45) Date of Patent: Dec. 8, 2015

(54) NONVOLATILE STORAGE DEVICE AND METHOD OF STORING DATA THEREOF

(71) Applicant: SAMSUNG ELECTRONICS CO., LTD., Suwon-si, Gyeonggi-do (KR)

(72) Inventors: Nam-Ho Kim, Seoul (KR); Su-Gon Kim, Seoul (KR); Hyun Jin Choi, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 109 days.

(21) Appl. No.: 14/183,862

(22) Filed: Feb. 19, 2014

(65) Prior Publication Data
US 2014/0304457 A1  Oct. 9, 2014

(30) Foreign Application Priority Data
Apr. 9, 2013  (KR) .......................... 10-2013-0038754

(51) Int. Cl.
| | |
|---|---|
| *G06F 13/00* | (2006.01) |
| *G06F 12/00* | (2006.01) |
| *G06F 12/02* | (2006.01) |
| *G06F 3/06* | (2006.01) |

(52) U.S. Cl.
CPC .......... *G06F 12/0246* (2013.01); *G06F 3/0611* (2013.01); *G06F 3/0652* (2013.01); *G06F 3/0659* (2013.01); *G06F 3/0679* (2013.01); *G06F 2212/7208* (2013.01)

(58) Field of Classification Search
USPC ........................................................ 711/103
See application file for complete search history.

(56) References Cited

U.S. PATENT DOCUMENTS

| | | | |
|---|---|---|---|
| 6,160,741 | A | 12/2000 | Ueyama et al. |
| 6,748,482 | B1 | 6/2004 | Fackenthal |
| 7,110,301 | B2 | 9/2006 | Lee et al. |
| 8,117,380 | B2 | 2/2012 | Conley et al. |
| 8,358,538 | B2 | 1/2013 | Moschiano et al. |
| 2007/0047327 | A1 | 3/2007 | Goda et al. |
| 2008/0282024 | A1 | 11/2008 | Biswas et al. |
| 2011/0214033 | A1* | 9/2011 | Yoshii et al. ................... 714/758 |
| 2012/0218827 | A1 | 8/2012 | Baek |
| 2012/0246383 | A1* | 9/2012 | Asano et al. ................... 711/102 |

* cited by examiner

*Primary Examiner* — Sean D Rossiter
(74) *Attorney, Agent, or Firm* — F. Chau & Associates, LLC

(57) ABSTRACT

A data storing method of a nonvolatile storage device that includes a plurality of nonvolatile memory devices electrically connected to a plurality of channels is provided. The data storing method includes allocating part of write data provided from a host to the nonvolatile memory devices to each channel; determining whether at least one channel among the channels is present that is connected to a nonvolatile memory device in a last page offset state; and when the at least one channel is determined to be present, scheduling erase commands on the plurality of channels, scheduling write commands on the plurality of channels with respect to the allocated write data, and executing the erase commands and the write commands on the plurality of channels.

18 Claims, 7 Drawing Sheets

<Active Block>

NONVOLATILE STORAGE DEVICE AND METHOD OF STORING DATA THEREOF

CROSS-REFERENCE TO RELATED APPLICATIONS

A claim for priority under 35 U.S.C. §119 is made to Korean Patent Application No. 10-2013-0038754 filed Apr. 9, 2013, in the Korean Intellectual Property Office, the disclosure of which is incorporated by reference in its entirety herein.

BACKGROUND

1. Technical Field

The inventive concept described herein relates to a semiconductor memory device, and more particularly to a nonvolatile memory device and a data storing method thereof.

2. Discussion of Related Art

Semiconductor memory devices are divided into volatile memory devices and nonvolatile memory devices. While read and write speeds of a volatile memory device are fast, contents stored therein are lost at power-off. On the other hand, a nonvolatile memory device retains contents stored therein even at power-off. Thus, a nonvolatile memory device is typically used to store contents which need to be retained regardless of whether a power is supplied. The nonvolatile memory includes a read/write unit and a separate erase unit. For example, a read/write operation may be performed in units of page, and an erase operation may be performed in units of blocks.

However, when the erase operation is performed by the block unit, a time taken to perform the erase operation may be longer than that taken to perform the write operation.

SUMMARY

According to an exemplary embodiment of the inventive concept, a data storing method of a nonvolatile storage device that includes a plurality of nonvolatile memory devices electrically connected to a plurality of channels is provided. The data storing method includes allocating part of write data provided from a host to the nonvolatile memory devices to each channel; determining whether at least one channel among the channels is present that is connected to a nonvolatile memory device in a last page offset state; when the at least one channel is determined to be present, scheduling erase commands on the plurality of channels, scheduling write commands on the plurality of channels with respect to the allocated write data, and executing the erase commands and the write commands on the plurality of channels.

According to an exemplary embodiment of the inventive concept, a nonvolatile storage device includes a plurality of nonvolatile memory devices and a controller. The controller is electrically connected to the plurality of nonvolatile memory devices through a plurality of channels and is configured to allocated part of write data provided from a host to each channel. When at least one channel among the channels is present that connected to a nonvolatile memory device in a last page state, the controller schedules erase commands on the plurality of channels.

According to an exemplary embodiment of the inventive concept, a nonvolatile storage device includes a plurality of nonvolatile memory devices and a controller. Each memory device is connected to a respective one of a plurality of channels. The controller is connected to each of the channels and is configured to determine whether a write to a last page of a block within one of the memory devices has occurred. The controller schedules an erase operation to be performed on all of the memory devices using all the channels when it has determined that the write has occurred.

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION

Figure 1:
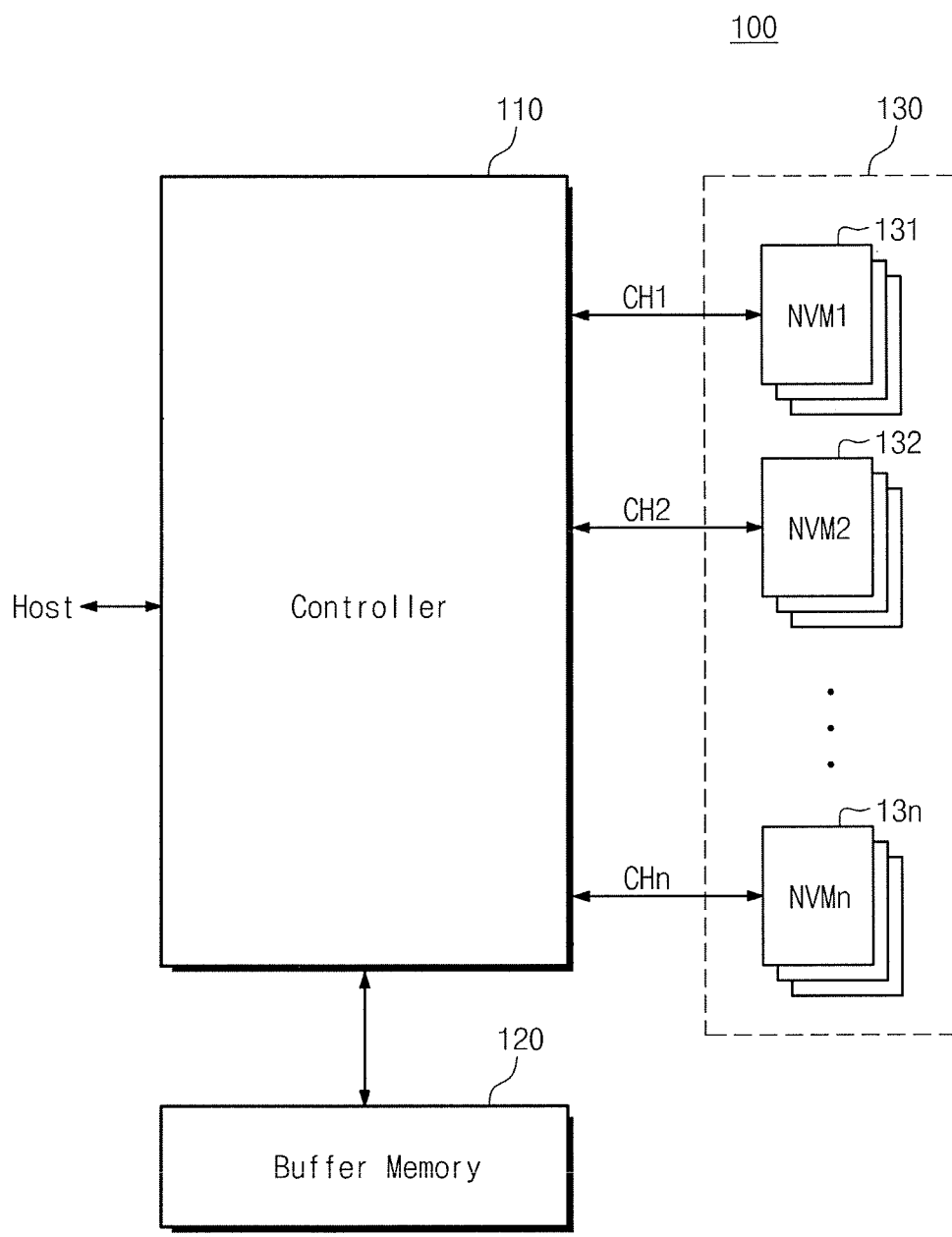
FIG. 1 is a block diagram schematically illustrating a nonvolatile storage device according to an exemplary embodiment of the inventive concept.

Embodiments of the inventive concept will be described in detail with reference to the accompanying drawings. The inventive concept, however, may be embodied in various different forms, and should not be construed as being limited only to the illustrated embodiments. Unless otherwise noted, like reference numerals denote like elements throughout the attached drawings and written description, and thus descriptions will not be repeated. In the drawings, the sizes and relative sizes of layers and regions may be exaggerated for clarity.

As used herein, the singular forms "a", "an" and "the" are intended to include the plural forms as well, unless the context clearly indicates otherwise. It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram schematically illustrating a nonvolatile storage device according to an exemplary embodiment of the inventive concept. Referring to FIG. 1, a nonvolatile storage device 100 receives data from a host and stores the received data in a nonvolatile memory device 130. In a synchronous write manner, the nonvolatile storage device 100 sends a write complete response to the host after the received data is stored in the nonvolatile memory device 130. The nonvolatile storage device 100 may shorten a response time by synchronizing erase operations of nonvolatile memories 131 to 13n respectively corresponding to channels CH1 to CHn.

The controller 110 receives data and a write command from the host. A buffer memory 120 temporarily stores the input data. A write operation of the nonvolatile memory device 130 may be performed in units of pages. For example, each of the nonvolatile memories can store several blocks, where each block includes several pages, and a write operation can update only one page in each block, or update multiple pages in one or multiple blocks. The controller 110 divides the input data by a page size of the nonvolatile memory device 130. The controller 130 allocates the divided portions of the input data to the channels CH1 to CHn, respectively. Write operations about the channels CH1 to CHn are performed according to independent scheduling. For example, the controller 110 can schedule a write to be performed across one or more of the channels CH1 to CHn to one or more corresponding nonvolatile memories 131-13n at one time, without being required to schedule a write to be performed across the remaining channels. If write operations of the nonvolatile memories 131 to 13n respectively corresponding to the channels CH1 to CHn end, the controller 110 sends a write complete response to the host.

A state in which a page address of a block in a nonvolatile memory currently performing a write operation is an address corresponding to the last page of the block may be referred to as a last page offset state. For example, a block in a nonvolatile memory comprises several pages, and when its last page is written, the block is considered to be in a last page offset state. In the event that a channel having the last page offset state exists, the controller 110 holds off scheduling of a subsequent write command during a predetermined time. The controller 110 schedules erase commands of blocks (hereinafter, referred to as next blocks) next to be used at all channels CH1 to CHn. For example, as soon as it is determined that one nonvolatile memory (e.g., 131) is in the last page offset state within a current block after a write across one of the channels (e.g. CH1), an erase operation is scheduled to be performed across all of the channels (e.g., CH1-CHn) on next blocks in each of the nonvolatile memories (e.g., 131-13n). In this way, the erase operations on all the channels CH1 to CHn are synchronized. Since the erase operation is scheduled, it means that it will be performed at a later time unless it is cancelled. Then, the controller 110 schedules write commands of data allocated to the channels CH1 to CHn. Afterwards, the nonvolatile memories 131 to 13n perform operations using the above-described scheduling. A response time of the nonvolatile storage device 100 may be shortened by synchronizing erase operations on the channels CH1 to CHn.

In the event that a current block of a nonvolatile memory of a channel has the last page offset state and its next block has been already erased, the controller 110 schedules write commands of data allocated to the channels CH1 to CHn without an erase command on the next blocks. The nonvolatile memories 131 to 13n perform write operations on data allocated according to the scheduling without an erase operation.

The buffer memory 120 temporarily stores data provided from the host before it is stored in the nonvolatile memory device 130. The buffer memory 120 may be formed of a static random access memory (SRAM) or a dynamic random access memory (DRAM). In an exemplary embodiment, the operating speed of the buffer memory is faster than that of the nonvolatile memory device 130. In an exemplary embodiment, a device capable of storing data temporarily is used as the buffer memory 120.

The nonvolatile memory device 130 includes the nonvolatile memories 131 to 13n connected to the channels CH1 to CHn. First nonvolatile memories 131 are connected to a first channel CH1. Second nonvolatile memories 132 are connected to a second channel CH2. Nth nonvolatile memories 13n are connected to an nth channel CHn. The nonvolatile memories 131 to 13n store data allocated by the controller 110. The nonvolatile memories 131 to 13n are managed independently in units of channels. For example, one or more of the nonvolatile memories can be written to using one or more of the corresponding channels, without using the remaining channels to write to the remaining nonvolatile memories. The nonvolatile memory device 130 includes a read/write unit and an erase unit that is different from the read/write unit. The nonvolatile memory device 130 may perform a read/write operation in units of pages and an erase operation in units of blocks.

In the nonvolatile memory device 130, a time taken to perform a write operation may be shorter than that taken to perform an erase operation since a read/write operation is performed in units of pages and an erase operation is performed in units of blocks. Thus, a response time of the nonvolatile storage device 100 may become longer in proportion to the number of erase operations. The nonvolatile storage device 100 according to an exemplary embodiment of the inventive concept is configured to synchronize erase operations of the nonvolatile memories 131 to 13n. In this embodiment, the number of erase operations independently performed with respect to each channel is reduced, so that the number of erase operations performed per unit time is reduced. Thus, a response time of the nonvolatile storage device 100 to perform a write command from the host may be shortened.

Figure 2:
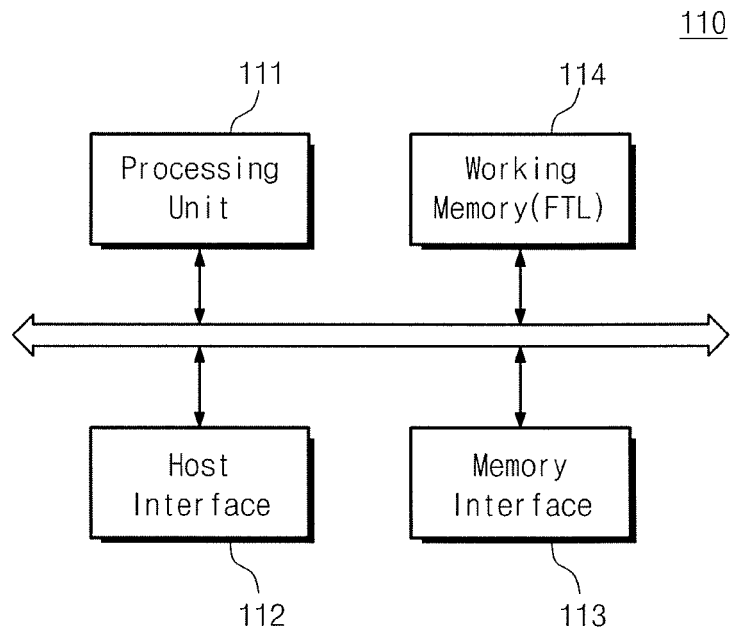
FIG. 2 is a block diagram schematically illustrating a controller illustrated in FIG. 1, according to an exemplary embodiment of the inventive concept.

FIG. 2 is a block diagram schematically illustrating a controller illustrated in FIG. 1, according to an exemplary embodiment of the inventive concept. Referring to FIG. 2, a controller 110 includes a processing unit 111 (e.g., a processor), a host interface 112, a memory interface 113, and a working memory 114. It is understood that the controller 110 is not limited to include the above-described components. For example, the controller 110 may further comprise a read only memory (ROM) to store code data for an initial booting operation, an error correcting code (ECC) block to correct an error of data, a synchronous DRAM (SDRAM), etc. The working memory 114 may be a flash memory, as an example.

The processing unit 111 may include a central processing unit or a microprocessor. The processing unit 111 controls an overall operation of the controller 110. The processing unit 111 is configured to drive firmware for controlling the controller 110. The firmware is loaded and driven on the working memory 114. The processing unit 111 divides data received from a host by a page size. The processing unit 111 allocates divided portions of the received data to channels CH1 to CHn, respectively. The processing unit 111 performs write operations about the channels CH1 to CHn and then sends a write complete response to the host. In the event that a channel having a last page offset state exists, the processing unit 111 provides the memory interface 113 with information indicating that a channel having a last page offset state exists.

The host interface 112 provides an interface between the host and the controller 110. The host and the controller 110 are connected through one of various standardized interfaces. Alternatively, the host and the controller 110 are connected through multiple standardized interfaces. Here, the standardized interfaces may include ATA (Advanced Technology Attachment), SATA (Serial ATA), e-SATA (external SATA), SCSI (Small Computer Small Interface), SAS (Serial Attached SCSI), PCI (Peripheral Component Interconnection), PCI-E (PCI Express), USB (Universal Serial Bus), IEEE 1394, NVMe (Non-volatile Memory Express), Card, etc.

The memory interface 113 provides an interface between the controller 110 and a nonvolatile memory device 130 (refer to FIG. 1). The memory interface 113 controls nonvolatile memories 131 to 13n, independently. Data allocated to the channels CH1 to CHn through the processing unit 111 is stored in the nonvolatile memories 131 to 13n through the memory interface 113. The memory interface 113 schedules write/erase commands of the nonvolatile memories 131 to 13n. Also, the memory interface 113 provides an interface between the controller 110 and the buffer memory 120.

In the event that a channel having a last page offset state exists (e.g., a nonvolatile memory connected to the channel has written a last page in a block), for example, when a first channel CH1 has a last page offset state, the memory interface 113 informs the processing unit 111 of last page offset state information. The memory interface 113 schedules an erase command of a block to be next block (hereinafter, referred to as a next block) in response to the last page offset state information. Then, the memory interface 113 schedules a write command of data allocated by the processing unit 111. Afterwards, the nonvolatile memories 131 to 13n operate according to scheduling. In the event that a current block of a channel has a last page offset state and the next block is already erased, the memory interface 113 does not inform the processing unit and schedules a write command of allocated data.

The working memory 114 stores data and firmware for controlling the controller 110. The firmware and data stored in the working memory 114 are driven by the processing unit 111. The working memory 114 may include at least one of a cache memory, a DRAM, an SRAM, a phase change memory (PRAM), a ROM, a flash memory, etc. The working memory 114 may store a Flash Translation Layer (FTL).

The nonvolatile memory device 130 has such a characteristic that a read/write operation is performed in units of pages and an erase operation is performed in units of blocks. Read, write and erase operations of the nonvolatile memory device 130 may be managed by the FTL, which is system software. The FTL manages an operation of the nonvolatile memory device 130 in response to an access (e.g., a read/write operation) requested from the host. The FTL is loaded on the working memory 114 and driven by the processing unit 111. The FTL informs of last page offset state information. The FTL informs of address information of a next block. The FTL informs whether the next block is already erased.

The processing unit 111 allocates data provided from the host to the channels CH1 to CHn. The memory interface 113 schedules write commands of data independently allocated to the channels CH1 to CHn. The nonvolatile memories 131 to 13n perform write operations according to the scheduling. If a channel having a last page offset state (e.g., a block of a nonvolatile memory connected to the channel has written to its last page) is generated during write operations of the channels CH1 to CHn, last page offset state information of the memory interface 113 is provided to the processing unit 111. The memory interface 113 schedules erase commands of next blocks such that erase operations of the nonvolatile memories 131 to 13n are synchronized to the channels CH1 to CHn. A response time of a nonvolatile storage device 100 may be shortened by synchronizing erase operations requiring a time relatively longer than that of a write operation.

Figure 3:
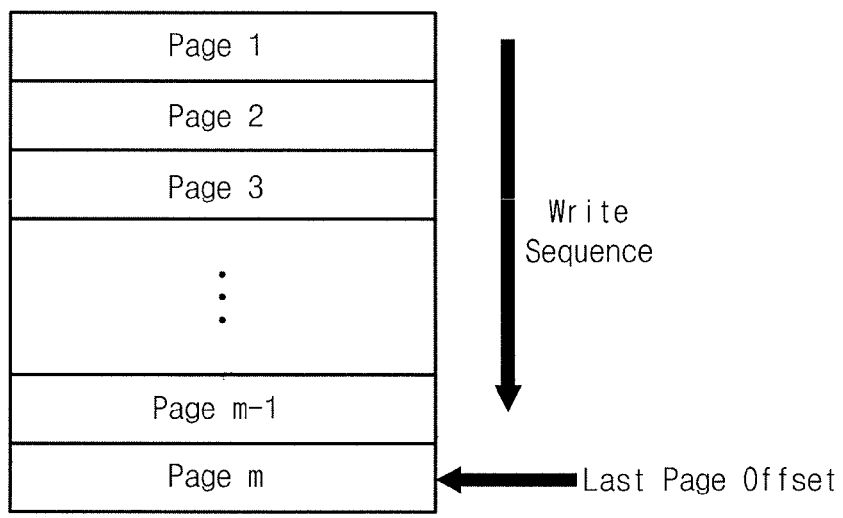
FIG. 3 is a diagram schematically illustrating a block included in a nonvolatile memory device illustrated in FIG. 1, according to an exemplary embodiment of the inventive concept.

FIG. 3 is a diagram schematically illustrating a block included in a nonvolatile memory device illustrated in FIG. 1, according to an exemplary embodiment of the inventive concept. Referring to FIG. 3, a block includes a plurality of pages. Nonvolatile memories 131 to 13n each include a plurality of blocks. The nonvolatile memories 131 to 13n perform a read/write operation in units of pages and an erase operation in units of blocks. A block in which a write operation is being currently performed is referred to as an active block. For example, a block including m pages sequentially performs a write operation from a first page until an mth page. If a last page offset state is generated, a controller 110 first erases a next block (i.e., a block to be next used). In the event that the next block is already erased, the nonvolatile memories 131 to 13n continues to perform write operations without execution of an erase operation. The next block may be a free block. For example, a prior process may have written data to a number of blocks, and then freed one of those blocks so another process can make use of the freed block.

Figure 4:
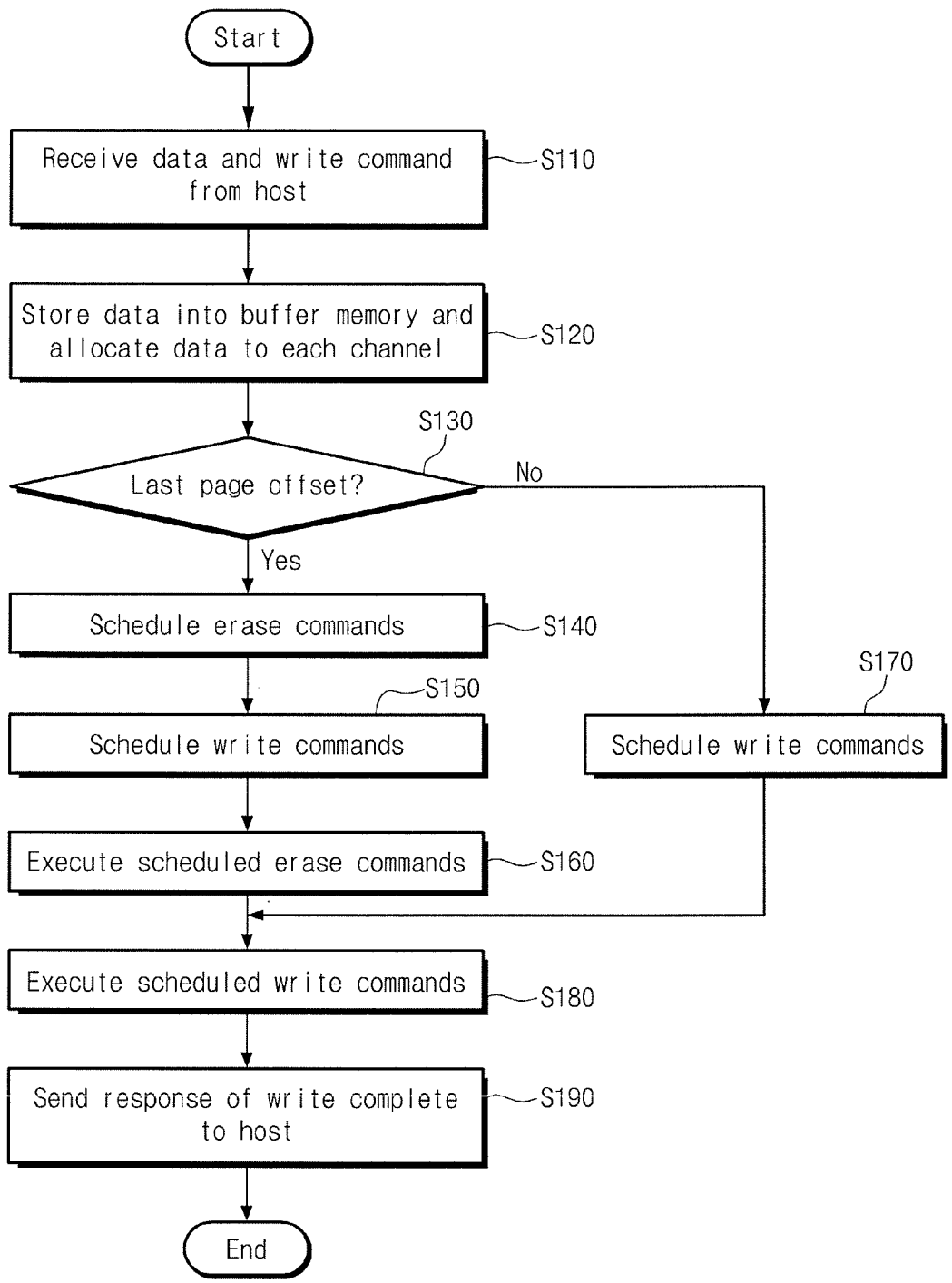
FIG. 4 is a flow chart schematically illustrating a data storing method of a nonvolatile storage device illustrated in FIG. 1, according to an exemplary embodiment of the inventive concept.

FIG. 4 is a flow chart schematically illustrating a data storing method of a nonvolatile storage device illustrated in FIG. 1, according to an exemplary embodiment of the inventive concept. Below, a data storing method of a nonvolatile storage device will be more fully described with reference to FIGS. 1 to 4.

In step S110, a controller 110 receives data and a write command from a host.

In step S120, the received data is temporarily stored in a buffer memory 120. In an exemplary embodiment, the buffer memory 120 is formed of a DRAM having a fast operating speed. The controller 110 allocates some of the received data to each channel. A nonvolatile memory device 130 performs a write operation in units of pages. Thus, the controller 110 divides the received data by a page size and allocates the divided portions of the received data to each channel. For example, if a page size is 1 Megabyte, and the received data is 180 Megabytes, there would be 180 divided portions each of 1 Megabyte, where some of the divided portions are allocated to each channel. Please note that a page size of 1 Megabyte is merely an example, as the page size may vary.

In step S130, the controller 110 determines whether a channel having a last page offset state exists. Last page offset state information may be stored in a flash translation layer. When a channel having a last page offset state does not exist, the method proceeds to step S170. When a channel having a last page offset state exists, the method proceeds to step S140.

In step S140, the controller 110 schedules erase commands of next blocks on all channels CH1 to CHn.

In step S150, the controller 110 schedules write commands of data allocated to the channels CH1 to CHn in step S120.

In step S160, nonvolatile memories 131 to 13n corresponding to the channels CH1 to CHn perform erase operations according to scheduling. Thus, erase operations of next blocks on all channels CH1 to CHn are synchronized.

In step S170, the controller 110 schedules write commands of data allocated to the channels CH1 to CHn in step S120.

In step S180, the nonvolatile memories 131 to 13n corresponding to the channels CH1 to CHn perform write operations of allocated data according to scheduling of step S150 or S170.

In step S190, the controller 110 sends a write complete response to the host. In a synchronous write manner, the controller 110 may send a write complete response after write operations of the nonvolatile memories 131 to 13n corresponding to the all channels CH1 to CHn are completed.

A data storing method of a nonvolatile storage device 100 according to an embodiment of the inventive concept synchronizes erase operations of the nonvolatile memories 131 to 13n corresponding to the all channels CH1 to CHn. A response time of the nonvolatile storage device 100 may be shortened by synchronizing erase operations on all channels CH1 to CHn. A time taken to perform an erase operation is longer than that taken to perform a write operation.

Figure 5:
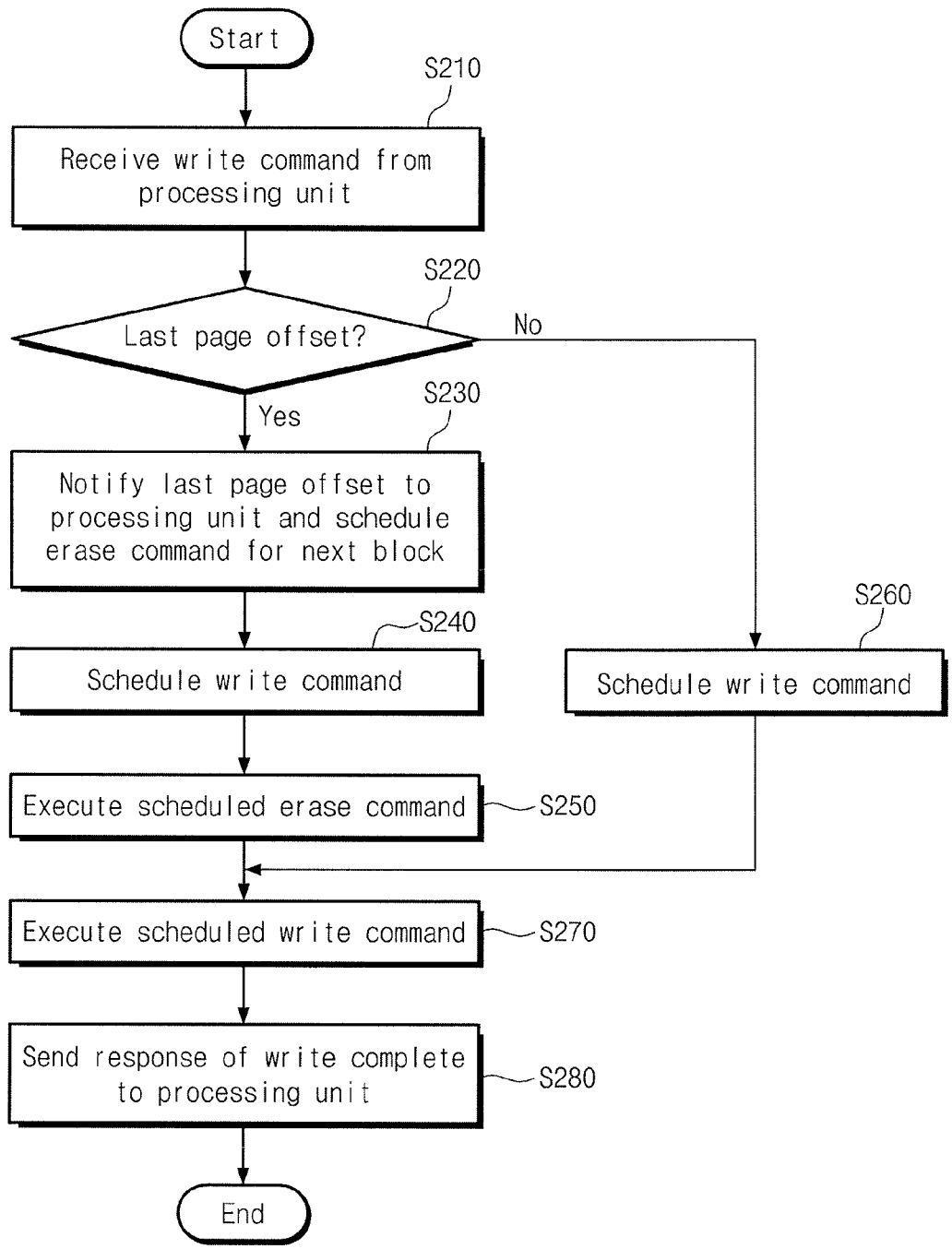
FIG. 5 is a flow chart schematically illustrating an operation of each channel of a nonvolatile storage device illustrated in FIG. 1, according to an exemplary embodiment of the inventive concept.

FIG. 5 is a flow chart schematically illustrating an operation of each channel of a nonvolatile storage device illustrated in FIG. 1, according to an exemplary embodiment of the inventive concept. Below, an operation on a first channel CH1 will be more fully described with reference to FIGS. 1 to 3 and 5.

In step S210, a memory interface 113 receives a write command on allocated data of a first channel CH1 from a processing unit 111.

In step S220, the memory interface 113 determines whether first nonvolatile memories 131 of the first channel CH1 are at a last page offset state. The last page offset state information may be stored in a flash translation layer. When the first nonvolatile memories 131 are not at a last page offset state, the method proceeds to step S260. When the first nonvolatile memories 131 are at a last page offset state, the method proceeds to step S230.

In step S230, the memory interface 113 informs the processing unit 111 of last page offset state information. The memory interface 113 schedules an erase command of a next block in the first nonvolatile memories 131.

In step S240, the memory interface 113 schedules a write command of data allocated by the processing unit 111.

In step S250, the first nonvolatile memories 131 perform the erase operation of the next block according to scheduling of step S230. At this time, erase operations of nonvolatile memories 131 to 13n corresponding to all channels CH1 to CHn are synchronized.

In step S260, the memory interface 113 schedules a write command of data allocated by the processing unit 111 without scheduling of an erase operation of a next block and without informing to the processing unit 111.

In step S270, the first nonvolatile memories 131 perform a write operation of allocated data according to scheduling of step S240 or S260.

In step S280, when the write operation of the first nonvolatile memories 131 on the allocated data is completed, the memory interface 113 sends a write complete response to the processing unit 111. If write operations of the nonvolatile memories 131 to 13n corresponding to all channels CH1 to CHn are completed, the processing unit 111 sends a write complete response to the host. An operation on the first channel CH1 is described. However, the above-described operation is performed with respect to all channels CH1 to CHn.

Figure 6:
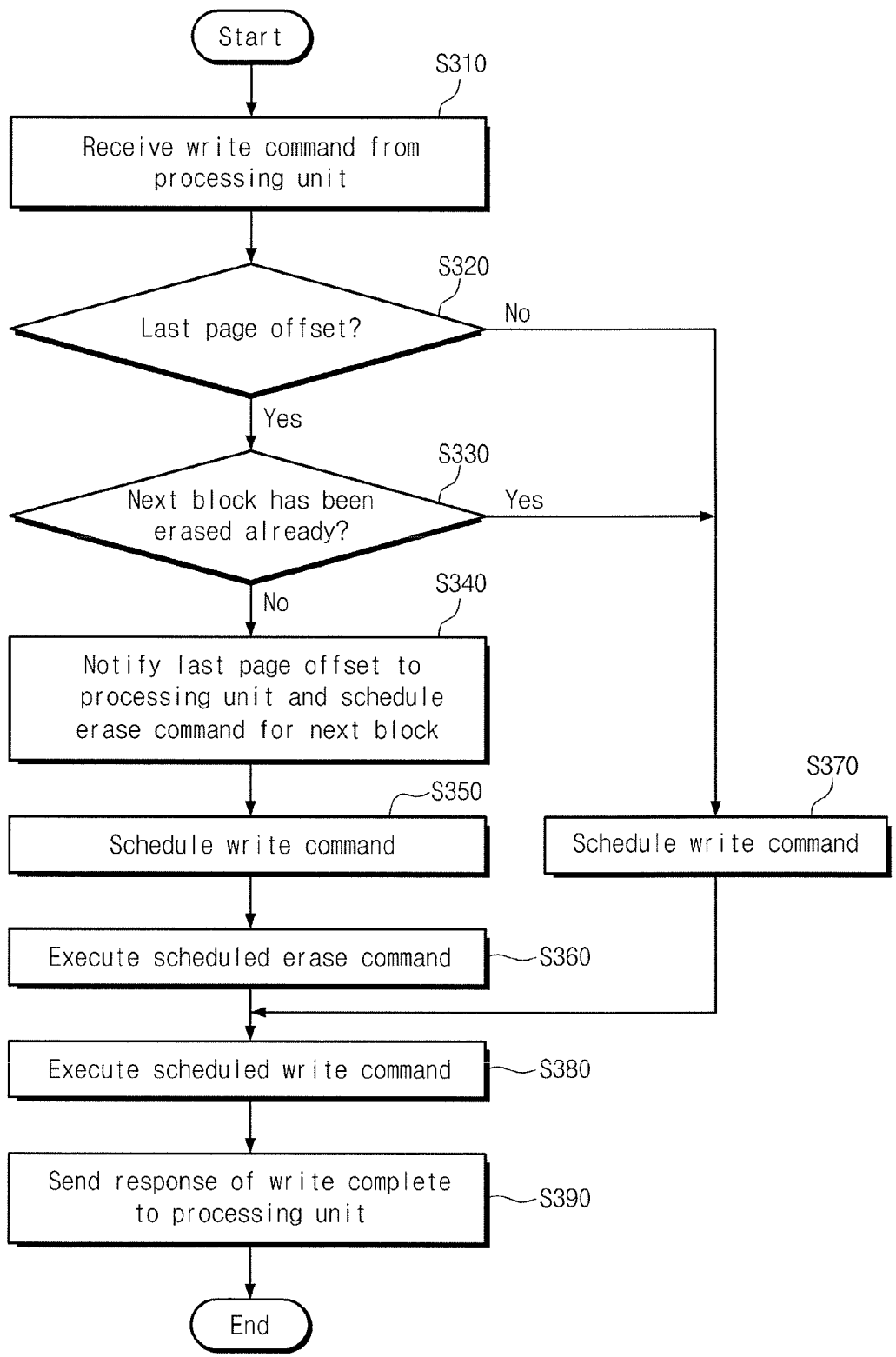
FIG. 6 is a flow chart schematically illustrating an operation of each channel of a nonvolatile storage device illustrated in FIG. 1, according to an exemplary embodiment of the inventive concept.

FIG. 6 is a flow chart schematically illustrating an operation of each channel of a nonvolatile storage device illustrated in FIG. 1, according to an exemplary embodiment of the inventive concept. Below, an operation on a first channel CH1 will be more fully described with reference to FIGS. 1 to 3 and 6.

In step S310, a memory interface 113 receives a write command on allocated data of a first channel CH1 from a processing unit 111.

In step S320, the memory interface 113 determines whether first nonvolatile memories 131 of the first channel CH1 are at a last page offset state. The last page offset state information may be stored in a flash translation layer. When the first nonvolatile memories 131 are not at a last page offset state, the method proceeds to step S370. When the first nonvolatile memories 131 are at a last page offset state, the method proceeds to step S330.

In step S330, the memory interface 113 determines whether a next block of the first nonvolatile memories 131 is already erased. Information indicating whether the next block of the first nonvolatile memories 131 is already erased may be stored in the flash translation layer. In the event that the next block of the first nonvolatile memories 131 is already erased, the method proceeds to step S370. In the event that the next block of the first nonvolatile memories 131 is not already erased, the method proceeds to step S340.

In the event that the first nonvolatile memories 131 are at a last page offset state and the next block of the first nonvolatile memories 131 is not erased, in step S340, the memory interface 113 informs the processing unit 111 of last page offset state information. The memory interface 113 schedules an erase command of the next block in the first nonvolatile memories 131.

In step S350, the memory interface 113 of the first channel CH1 schedules a write command of data allocated by the processing unit 111.

In step S360, the first nonvolatile memories 131 perform an erase operation of the next block according to scheduling of step S340. At this time, erase operations of nonvolatile memories 131 to 13n corresponding to all channels CH1 to CHn are synchronized.

In the event that the first nonvolatile memories 131 are not at a last page offset state, in step S370, the memory interface 113 does not inform the processing unit 111 of last page offset state information. Alternatively, in the event that the first nonvolatile memories 131 are at a last page offset state and the next block of the first nonvolatile memories 131 is already erased, the memory interface 113 does not inform the processing unit 111 of last page offset state information. The memory interface 113 schedules a write command of data allocated by the processing unit 111 without scheduling of an erase operation of a next block.

In step S380, the first nonvolatile memories 131 perform a write operation of allocated data according to scheduling of step S350 or S370.

In step S390, when the write operation of the first nonvolatile memories 131 on the allocated data is completed, the memory interface 113 sends a write complete response to the processing unit 111. If write operations of the nonvolatile memories 131 to 13n corresponding to all channels CH1 to CHn are completed, the processing unit 111 sends a write complete response to the host.

In the event that the first nonvolatile memories 131 are at a last page offset state and the next block of the first nonvolatile memories 131 is already erased, an operation on a next block is unnecessary. Thus, the memory interface 113 does not inform the processing unit 111 of last page offset state information. Therefore, a duplicated erase operation of the nonvolatile storage device 100 is prevented, and a response time of the nonvolatile storage device 100 may be shortened. An operation on the first channel CH1 is described. However, the above-described operation may be performed with respect to all channels CH1 to CHn.

Figure 7:
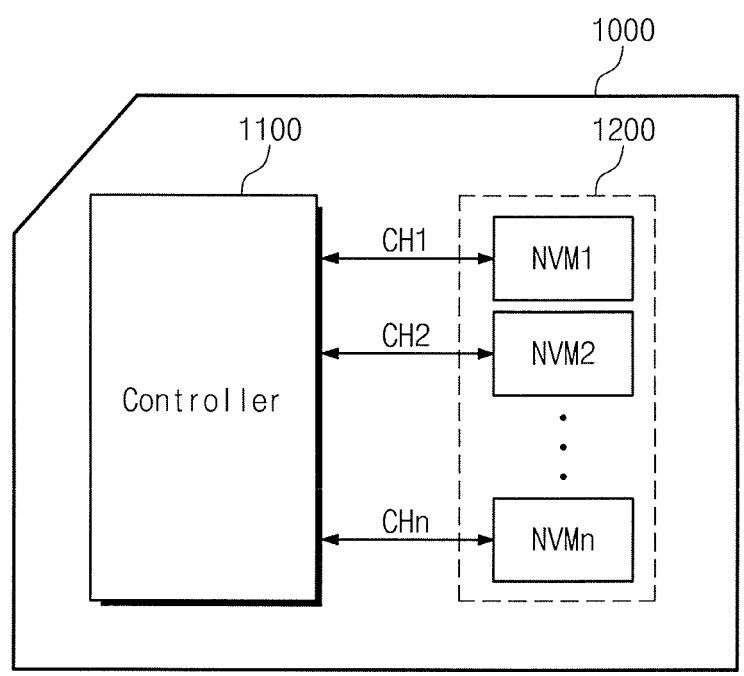
FIG. 7 is a block diagram schematically illustrating a memory card according to an exemplary embodiment of the inventive concept.

FIG. 7 is a block diagram schematically illustrating a memory card according to an exemplary embodiment of the inventive concept. Referring to FIG. 7, a memory card 1000 includes a controller 1100 and a nonvolatile memory device 1200. The controller 1100 and the nonvolatile memory device 1200 are connected through a plurality of channels CH1 to CHn. The nonvolatile memory device 1200 includes a plurality of nonvolatile memories NVM1 to NVMn that are connected to the channels CH1 to CHn and are managed independently. The controller 1100 may control the nonvolatile memory device 1200 based on control signals provided from an external device of the memory card 1000. The memory card 1000 is configured substantially the same as a nonvolatile storage device 100 illustrated in FIG. 1.

The controller 1100 is connected to the nonvolatile memory device 1200 through the channels CH1 to CHn. Each channel performs a write operation, independently. When an erase operation on one of the channels CH1 to CHn is performed, the controller 1100 performs erase operations on nonvolatile memories connected to all channels CH1 to CHn. A response time of the memory card 1000 is shortened by synchronizing erase operations on all channels CH1 to CHn.

The memory card 1000 is mounted on information processing devices such as a digital camera, a portable media player (PMP), a mobile phone, a notebook computer, a tablet computer, etc. The memory card 1000 may be used as a Multimedia Card (MMC), a Secure Digital (SD) card, a micro SD card, a memory stick, an ID card, a PCMCIA card, a chip card, a USB card, a smart card, a Compact Flash (CF) card, etc.

Figure 8:
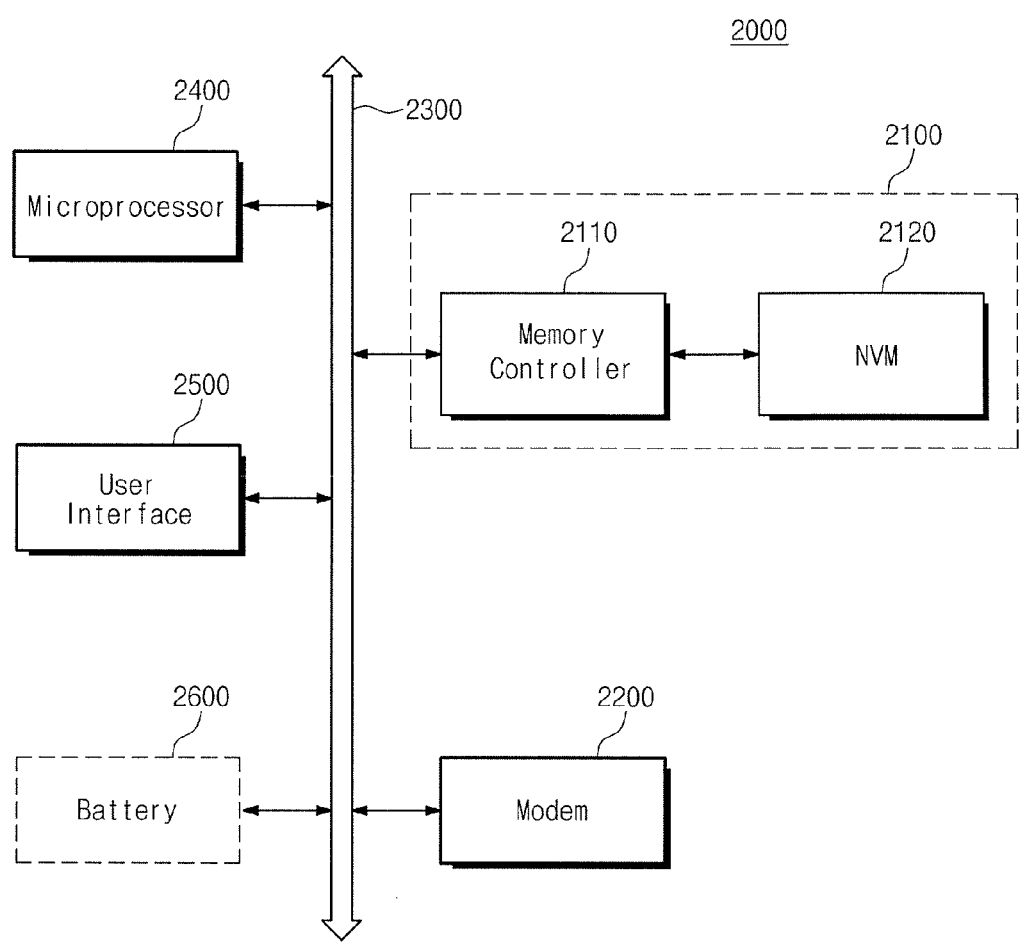
FIG. 8 is a block diagram schematically illustrating a computing system including a nonvolatile storage device according to an exemplary embodiment of the inventive concept.

FIG. 8 is a block diagram schematically illustrating a computing system including a nonvolatile storage device according to an exemplary embodiment of the inventive concept. Referring to FIG. 8, a computing system 2000 according to an exemplary embodiment of the inventive concept comprises a nonvolatile storage device 2100, a microprocessor 2400, a user interface 2500, and a modem 2200 such as a baseband chip, which are electrically connected to a system bus 2300. The nonvolatile storage device 2100 is substantially the same as a nonvolatile storage device 100 illustrated in FIG. 1.

If the computing system 2000 is a mobile device, the computing system 2000 further comprises a battery 2600 for supplying an operating voltage to the computing system 2000. Although not shown in FIG. 8, the computing system 2000 may further comprise an application chipset, a Camera Image Processor (CIS), a mobile DRAM, etc.

A memory controller 2110 is connected to a nonvolatile memory device 2120 through a plurality of channels. Each channel performs a write operation, independently. When an erase operation on one of the channels CH1 to CHn is performed, the memory controller 2110 performs erase operations on nonvolatile memories connected to all channels. A response time of the nonvolatile storage device 2100 is shortened by synchronizing erase operations on all channels.

In at least one exemplary embodiment, a nonvolatile memory device and/or a memory controller may be packed using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

At least one embodiment of the inventive concept can be embodied as computer-readable codes having computer executable instructions on a computer-readable medium. For example, the operations/steps of FIG. 4, FIG. 5, and FIG. 6 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

While the inventive concept has been described with reference to exemplary embodiments, various changes and modifications may be made without departing from the spirit and scope of the present invention.

What is claimed is:

1. A data storing method of a nonvolatile storage device that comprises a plurality of nonvolatile memory devices electrically connected to a plurality of channels, the data storing method comprising:
   allocating part of write data provided from a host to the nonvolatile memory devices to each channel;
   determining whether at least one channel among the channels is present that is connected to a nonvolatile memory device in a last page offset state; and
   when the at least one channel is determined to be present;
   scheduling erase commands for a next block of the nonvolatile memory device to be performed across the plurality of channels;
   scheduling write commands to be performed across the plurality of channels with respect to the allocated write data; and
   executing the erase commands and the write commands across the plurality of channels.

2. The data storing method of claim 1, further comprising:
   when the at least one channel is determined not to be present, scheduling write commands across the plurality of channels with respect to the allocated write data.

3. The data storing method of claim 1, wherein when the at least one channel is determined to be present, the erase commands are only executed if the next block of the nonvolatile memory device to be used has not already been erased.

4. The data storing method of claim 1, further comprising:
   transferring a write complete response to the host after the erase commands and the write commands across the plurality of channels are executed.

5. The data storing method of claim 1, further comprising:
   temporarily storing the write data provided from the host in a buffer memory.

6. A nonvolatile storage device, comprising:
   a plurality of nonvolatile memory devices; and
   a controller electrically connected to the plurality of nonvolatile memory devices through a plurality of channels and configured to allocate part of write data provided from a host to each channel,
   wherein the controller schedules erase commands on a next block of a nonvolatile memory device among the nonvolatile memory devices to be performed across the plurality of channels when the controller determines at least one channel among the channels is present that is connected to the nonvolatile memory device in a last page offset state.

7. The nonvolatile storage device of claim 6, wherein the controller schedules write commands to be performed across the plurality of channels with respect to the allocated data after scheduling the erase commands.

8. The nonvolatile storage device of claim 7, wherein the controller sends a write complete response to the host after the erase commands and the write commands across the plurality of channels are executed.

9. The nonvolatile storage device of claim 6, wherein when the at least one channel is present and the next block of the nonvolatile device to be used is already erased, the controller schedules write commands across the plurality of channels with respect to the allocated write data without scheduling of erase commands across the plurality of channels.

10. The nonvolatile storage device of claim 6, wherein the controller is driven by a flash translation layer that stores information for determining whether at least one nonvolatile memory device among the plurality of nonvolatile memory devices is in the last page offset state.

11. The nonvolatile storage device of claim 10, wherein the flash translation layer stores information on erase conditions of the plurality of nonvolatile memory devices.

12. The nonvolatile storage device of claim 6, wherein the controller comprises:
a processing unit configured to allocate the parts of the write data to each channel.

13. The nonvolatile storage device of claim 6, further comprising:
a buffer memory configured to temporarily store the write data provided from the host.

14. A nonvolatile storage device, comprising:
a plurality of nonvolatile memory devices, where each memory device is connected to a respective one of a plurality of channels;
a controller connected to each of the channels and configured to determine whether a write to a last page of a block within one of the memory devices has occurred, wherein the controller schedules an erase operation for a next block to be performed on all of the memory devices using all the channels when it has determined that the write has occurred.

15. The nonvolatile storage device of claim 14, wherein when the controller has determined that the write has occurred, the controller schedules a write operation to be performed on at least one of the memory devices, and then executes the erase operation followed by the write operation.

16. The nonvolatile storage device of claim 14, wherein when the controller has determined that the write has occurred, the controller schedules a write operation to be performed on at least one of the memory devices, and executes only the write operation among the erase and write operations when the next block to be used has already been erased.

17. The nonvolatile storage device of claim 14, wherein the controller is configured to divide input data received from a host by a page size of the memory devices into divided portions and allocate the divided portions among the channels.

18. The nonvolatile storage device of claim 15, wherein the controller outputs a write complete response after the erase and write operations are executed.

* * * * *